United States Patent
Zhou

(10) Patent No.: US 9,300,702 B2
(45) Date of Patent: Mar. 29, 2016

(54) NETWORK CONFERENCE METHOD AND APPARATUS

(71) Applicant: Huawei Technologies Co., Ltd., Shenzhen, Guangdong (CN)

(72) Inventor: Riming Zhou, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 527 days.

(21) Appl. No.: 13/707,470

(22) Filed: Dec. 6, 2012

(65) Prior Publication Data

US 2013/0103763 A1    Apr. 25, 2013

Related U.S. Application Data

(63) Continuation of application No. PCT/CN2011/084180, filed on Dec. 19, 2011.

(30) Foreign Application Priority Data

Dec. 28, 2010   (CN) .......................... 2010 1 0614735

(51) Int. Cl.
*H04L 29/06*    (2006.01)
*H04L 12/18*   (2006.01)

(52) U.S. Cl.
CPC .......... *H04L 65/403* (2013.01); *H04L 12/1818* (2013.01)

(58) Field of Classification Search
CPC ............ H04L 67/1004; H04L 67/1008; H04L 67/1012; H04L 67/1025; H04L 67/1029; H04L 67/1031; H04L 65/403; H04L 65/4038; H04L 65/4046; H04L 65/105; H04L 65/4053; H04L 29/08; H04L 29/06421; H04L 29/06517; H04L 29/06428
USPC .......................... 709/204, 205, 225; 455/453; 379/202.01
See application file for complete search history.

(56) References Cited

U.S. PATENT DOCUMENTS 7,298,834 B1 * 11/2007 Homeier et al. .......... 379/202.01
7,617,280 B1 * 11/2009 Webster et al. ............... 709/204

(Continued)

FOREIGN PATENT DOCUMENTS

| CN | 1647548 A | 7/2005 |
|---|---|---|
| CN | 101047534 A | 10/2007 |

(Continued)

OTHER PUBLICATIONS

Extended European Search Report in corresponding European Patent Application No. 11853440.3 (Oct. 1, 2013).

(Continued)

*Primary Examiner* — Cheikh Ndiaye
(74) *Attorney, Agent, or Firm* — Leydig, Voit & Mayer, Ltd.

(57) ABSTRACT

The present invention, relating to the field of network communications, discloses a network conference method and apparatus. The method includes: receiving, by a local proxy server, a conference request for creating a conference from a user equipment, and requesting information of registered floor servers on a conference center server from the conference center server; detecting floor servers in the floor server information according to the floor server information, using a floor server complying with a first preset standard as a destination floor server, and sending the conference request to the destination floor server; and establishing a media channel between the local proxy server and the destination floor server, and a media channel between the local proxy server and the user equipment to enable the user equipment to carry out a network conference with the floor server by using the established media channels.

13 Claims, 6 Drawing Sheets

(56) References Cited

U.S. PATENT DOCUMENTS

| | | | |
|---|---|---|---|
| 2002/0133611 A1* | 9/2002 | Gorsuch et al. | 709/231 |
| 2005/0094579 A1 | 5/2005 | Acharya et al. | |
| 2005/0108328 A1 | 5/2005 | Berkeland et al. | |
| 2006/0225117 A1* | 10/2006 | Ono et al. | 725/117 |
| 2008/0069011 A1* | 3/2008 | Sekaran et al. | 370/260 |

FOREIGN PATENT DOCUMENTS

| | | |
|---|---|---|
| CN | 101296101 A | 10/2008 |
| CN | 102136920 A | 7/2011 |
| WO | WO 0060472 A1 | 10/2000 |
| WO | WO 03049459 A1 | 6/2003 |

OTHER PUBLICATIONS

1st Office Action in corresponding Chinese Patent Application No. 201010614735.5 (Sep. 28, 2012).

International Search Report in corresponding International Patent Application No. PCT/CN2011/084180 (Mar. 15, 2012).

* cited by examiner

CONT.
FROM
FIG. 6A

```
Proxy 1 sends an information acquisition request,
where the information acquisition request carries the    ) 606
conference number of the conference to join
                         │
                         ▼
The Center returns information of a floor server where
the conference corresponding to the conference           ) 607
number of the conference to join is located
                         │
                         ▼
After receiving the information returned by the
Center, Proxy 1 sends a conference request to the floor  ) 608
server
                         │
                         ▼
                      609~612
```

FIG. 6b

NETWORK CONFERENCE METHOD AND APPARATUS

CROSS-REFERENCE TO RELATED APPLICATIONS

This application is a continuation of International Patent Application No. PCT/CN2011/084180, filed on Dec. 19, 2011, which claims priority to Chinese Patent Application No. 201010614735.5, filed on Dec. 28, 2010, both of which are hereby incorporated by reference in their entireties.

FIELD OF THE INVENTION

The present invention relates to the field of network communications, and in particular to a network conference method and apparatus.

BACKGROUND OF THE INVENTION

A conference system is deployed on the Internet and provides conference functions for users, especially enterprise users, across a country or across the world. A conference server can be visited by a user equipment (UE, User equipment) for accessing the Internet as long as a public network IP address is available on the Internet. However, the network routing of the Internet is very complex. Therefore, a set of good network devices is needed to provide services with assured bandwidth and quality for users.

In the existing solution, a floor server (Floor server) is directly deployed on the Internet, and a proxy server (Conference Proxy) for directly accessing the floor server is deployed. In this way, the user equipment visits the floor server by using the proxy server.

However, in the existing solution, the user equipment visits one floor server only by using one proxy server. When the floor server is busy and the remaining bandwidth is insufficient, a status of joining conference by the user equipment is affected. When the proxy server is busy and the remaining bandwidth is insufficient, the status of joining conference by the user equipment is affected.

SUMMARY OF THE INVENTION

Embodiments of the present invention provide a network conference method and apparatus to solve the following problem in the prior art: when a floor server or proxy server is busy and the remaining bandwidth is insufficient, a status of joining conference by a user equipment is affected, thereby causing poor user experience.

An embodiment of the present invention provides a network conference method, including:

receiving a conference request for creating a conference from a user equipment, and sending an information acquisition request to a center server; receiving information of floor servers registered in the center server that is returned by the center server; detecting floor servers in the floor server information according to the floor server information, using a floor server complying with a first preset standard as a destination floor server, and sending the conference request to the destination floor server; and establishing a media channel between a local proxy server and the destination floor server, and a media channel between the local proxy server and the user equipment respectively to enable the user equipment to carry out a network conference with the floor server by using the established media channels.

In addition, an embodiment of the present invention further provides a network conference method, including:

sending an information acquisition request to a center server; when proxy server information returned by the center server is received, detecting proxy servers in the proxy server information, using a proxy server complying with a standard as a destination proxy server according to the detection result, and sending a conference request to the destination proxy server; and establishing a media channel with the destination proxy server, and carrying out a network conference by using the established media channel.

In addition, an embodiment of the present invention further provides a proxy server, including:

a receiving module, configured to receive a conference request for creating a conference from a user equipment, send an information acquisition request to a center server, and receive information of floor servers registered in the center server that is returned by the center server; a detecting module, configured to detect floor servers in the floor server information according to the floor server information, use a floor server complying with a first preset standard as a destination floor server, and send the conference request to the destination floor server; and a channel establishing module, configured to establish a media channel between a local proxy server and the destination floor server, and a media channel between the local proxy server and the user equipment respectively to enable the user equipment to carry out a network conference with the floor server by using the established media channels.

In addition, an embodiment of the present further provides a user equipment, including: a sending module, configured to send an information acquisition request to a center server; and a detecting module, configured to, when proxy server information returned by the center server is received, detect proxy servers in the proxy server information, and use a proxy server complying with a standard as a destination proxy server according to the detection result. The sending module is further configured to send a conference request to the destination proxy server; and the user equipment further includes: a channel establishing module, configured to establish a media channel with the destination proxy server, and carry out a network conference by using the established media channel.

Beneficial effects of the technical solutions according to the embodiments of the present invention are as follows:

The user equipment may detect the proxy servers according to the information provided by the center server and select a proxy server complying with a standard as a destination proxy server; or the proxy server may detect the floor servers according to the information provided by the center server and use a floor server complying with a standard as a destination floor server, which ensures that services used by users during a network conference are provided by the proxy server or floor server complying with the standard, and improves the quality of the network conference.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and those of ordinary skill in the art can derive other drawings from these accompanying drawings without creative efforts.

FIGS. 6a and 6b are flow charts of a network conference method according to an embodiment of the present invention;

DETAILED DESCRIPTION OF THE EMBODIMENTS

To make the objectives, technical solutions, and advantages of the present invention more comprehensible, the following describes the embodiments of the present invention in further detail below with reference to the accompanying drawings.

The following first briefs the architecture applied in the present invention.

A conference center server (ConfCenter) (center server for short hereinafter) is deployed on a hosted network. Generally, a set of conference system only needs one node.

A floor server (Floor server) is deployed on the hosted network. The floor server can be properly deployed according to the geographic location, and for example, may be deployed in an area (Beijing, Shanghai, or Guangzhou) with a large conference service volume.

Figure 1:
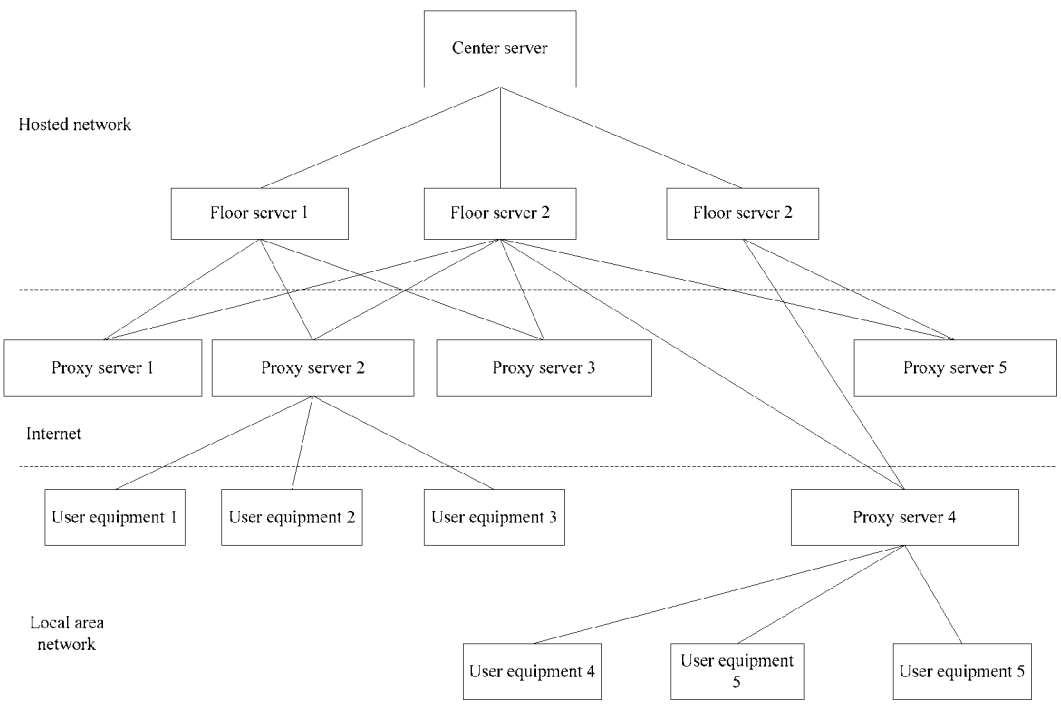
FIG. 1 is an architecture of a conference system according to an embodiment of the present invention.

An access proxy server (Conf Proxy) (proxy server for short hereinafter) is deployed on an access point on the Internet, that is, in an ISP (Internet Service Provider, Internet service provider). The proxy server may also be deployed within an enterprise (for example, a proxy server 4 shown in FIG. 1).

Figure 2:
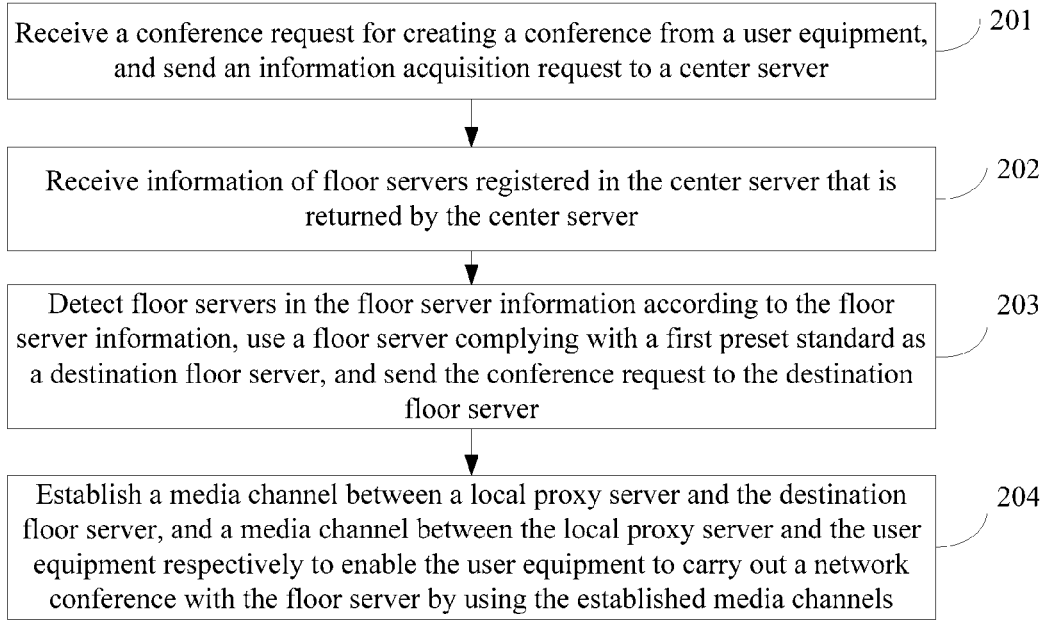
FIG. 2 is a flow chart of a network conference method according to an embodiment of the present invention.

FIG. 2 is a flow chart of a network conference method according to an embodiment of the present invention. The execution body in this embodiment is a proxy server. As shown in FIG. 2, the method according to this embodiment includes:

201: Receive a conference request for creating a conference from a user equipment, and send an information acquisition request to a center server.

202: Receive information of floor servers registered in the center server that is returned by the center server.

203: Detect floor servers in the floor server information according to the floor server information, use a floor server complying with a first preset standard as a destination floor server, and send the conference request to the destination floor server.

204: Establish a media channel between a local proxy server and the destination floor server, and a media channel between the local proxy server and the user equipment respectively to enable the user equipment to carry out a network conference with the floor server by using the established media channels.

The proxy servers, floor servers, and center server interact with each other on the Internet so that the proxy servers can detect the floor servers according to the information provided by the center server and use a floor server complying with a standard as a destination floor server, which ensures that services used by users during a network conference are provided by the floor server complying with the standard, and improves the quality of the network conference.

Figure 3:
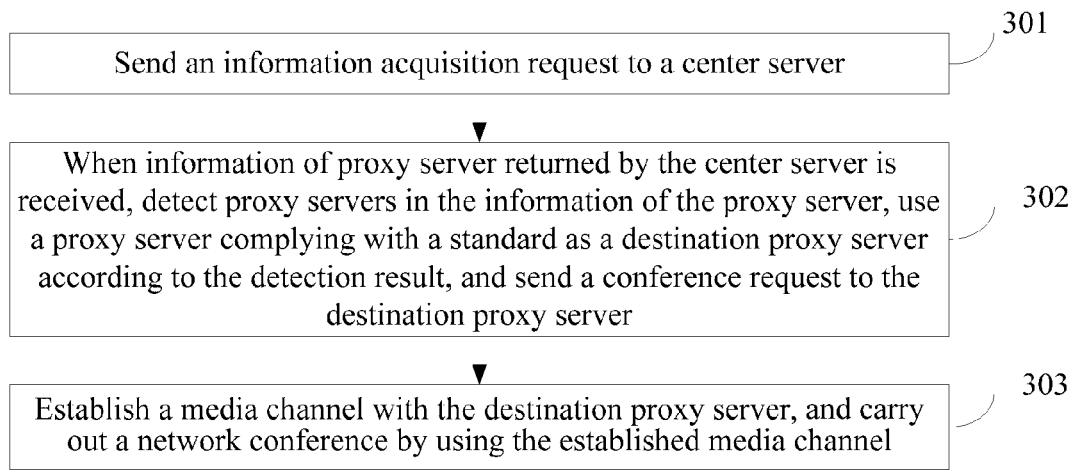
FIG. 3 is a flow chart of a network conference method according to an embodiment of the present invention.

FIG. 3 is a flow chart of a network conference method according to an embodiment of the present invention. The execution body in this embodiment is a user equipment. As shown in FIG. 3, the method according to this embodiment includes:

301: Send an information acquisition request to a center server.

302: When proxy server information returned by the center server is received, detect proxy servers in the proxy server information, use a proxy server complying with a standard as a destination proxy server according to the detection result, and send a conference request to the destination proxy server.

303: Establish a media channel with the destination proxy server, and carry out a network conference by using the established media channel.

The user equipment may detect the proxy servers according to the information provided by the center server and select a proxy server complying with a standard as a destination proxy server, which ensures that services used by users during a network conference are provided by the proxy server complying with the standard, and improves the quality of the network conference.

Figure 4:
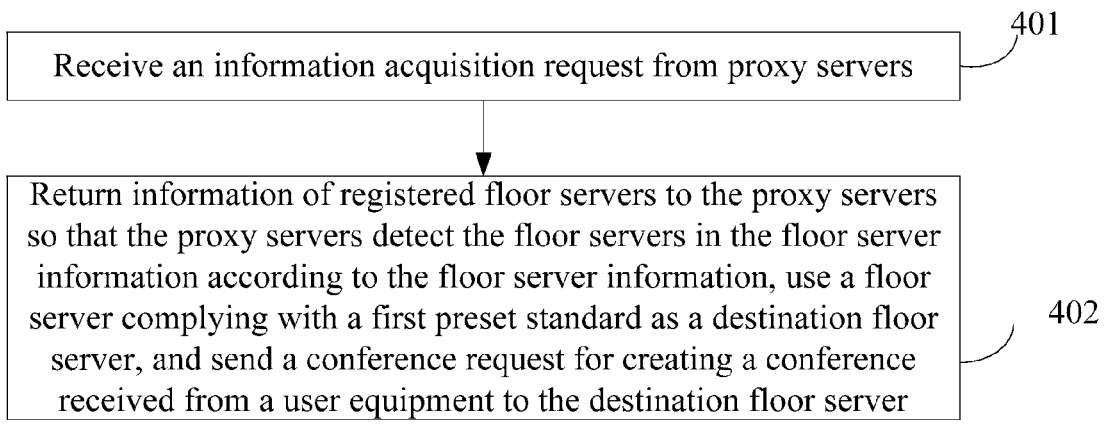
FIG. 4 is a flow chart of a network conference method according to an embodiment of the present invention.

FIG. 4 is a flow chart of a network conference method according to an embodiment of the present invention. The execution body in this embodiment is a center server. As shown in FIG. 4, the method according to this embodiment includes:

401: Receive an information acquisition request from proxy servers.

402: Return information of registered floor servers to the proxy servers so that the proxy servers detect the floor servers in the floor server information according to the floor server information, use a floor server complying with a first preset standard as a destination floor server, and send a conference request for creating a conference received from a user equipment to the destination floor server.

The floor server information is provided to the proxy servers so that the proxy servers select, according to the information provided by the center server, a floor server complying with a standard as a destination floor server, which ensures that services used by users during a network conference are provided by the proxy server complying with the standard, and improves the quality of the network conference.

Figure 5:
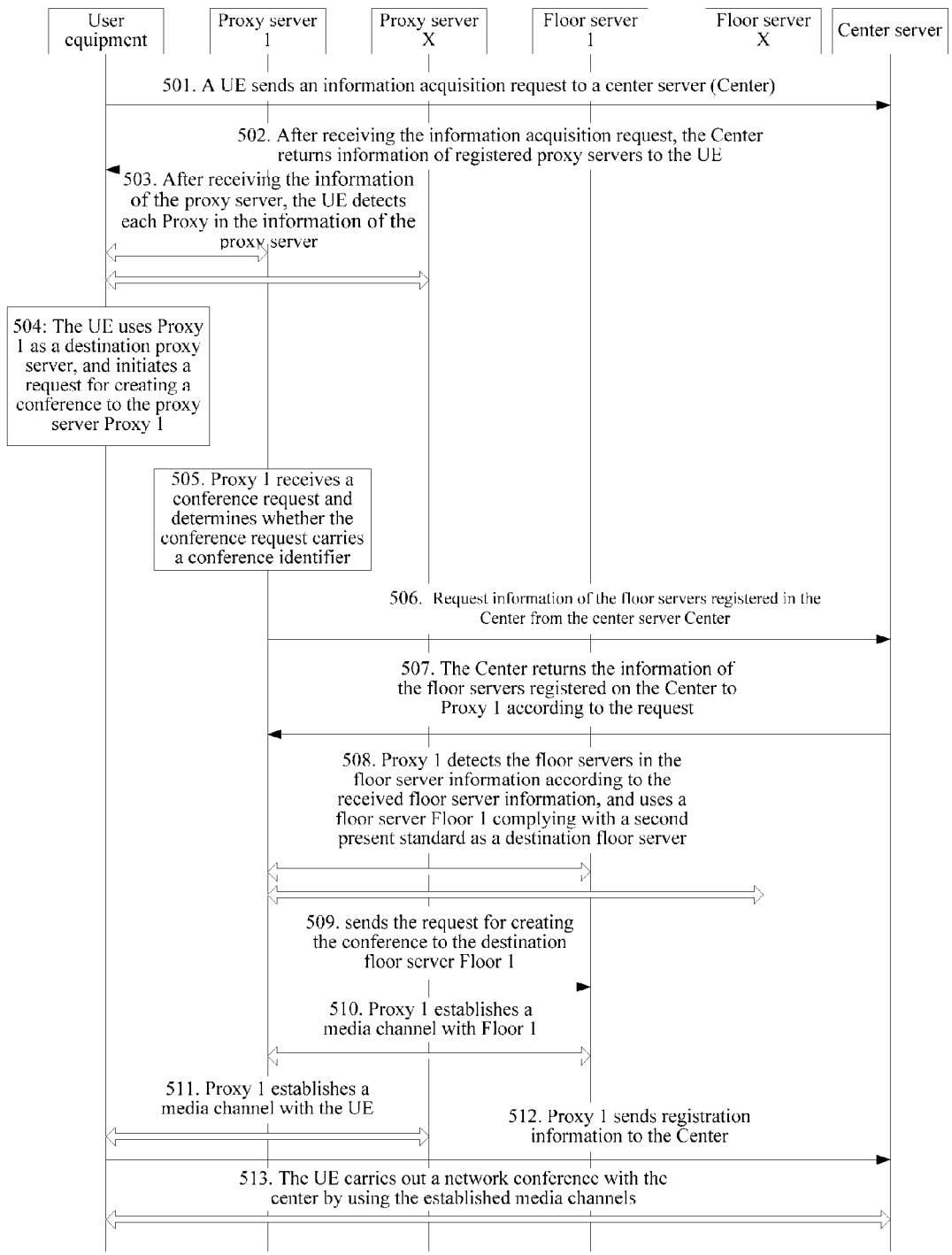
FIG. 5 is a flow chart of a network conference method according to an embodiment of the present invention.

FIG. 5 is a flow chart of a network conference method according to another embodiment of the present invention. As shown in FIG. 5, in this embodiment, the technical solution according to this embodiment is described in detail by using the case where a UE initiates a conference request for creating a conference as an example. The method according to this embodiment includes:

501: A UE sends an information acquisition request to a center server (Center)

The information acquisition request is used to request proxy server information from the center server.

In this embodiment, the UE sends the information acquisition request to the center server to create a conference.

502: After receiving the information acquisition request, the Center returns information of registered proxy servers (proxy) to the UE.

In this embodiment, the proxy server information includes information of the registered proxy servers. The proxy server information may be arranged by the Center according to registration information sent by each proxy, or may be deployed by the system and arranged and stored by using the information of each proxy server. The proxy server information specifically includes: address of the Proxy, and conference number of the conference being processed by the Proxy.

503: After receiving the proxy server information, the UE detects each Proxy in the proxy server information.

In this embodiment, the detection of each Proxy in the proxy server information by the UE specifically includes: sending the detection information to the registered proxy servers; and when information returned by the registered proxy servers according to the detection information is received, acquiring speeds of the proxy servers and a current status of each proxy server according to the information returned by the registered proxy servers.

The detection information is used to request the speeds (that is, available bandwidths) and current statuses of the proxy servers. It should be noted that the current statuses of the proxy servers, that is, busy degree of the proxy servers, may be measured by whether the proxy servers are occupied by conferences or whether conferences are queuing for the proxy servers.

504: The UE selects Proxy 1 complying with a second preset standard in the proxy server information according to the detected speeds of the proxy servers and the current status of each proxy server, uses Proxy 1 as a destination proxy server, and initiates a request for creating a conference to the destination proxy server Proxy 1.

In this embodiment, the second preset standard may be that the proxy servers whose current status is that they are occupied by the conferences or the number of conferences queuing for the proxy servers is smaller than a first preset threshold, and the speeds of the proxy servers are the highest among the servers smaller than the preset threshold. Selection of the proxy server may optimize a communication channel of the network conference, and enable the user equipment to select the proxy server according to the network condition. The first preset threshold may be set by the conference system according to the conference capacity, the number of conference members, or the processing speed of the proxy server.

Steps 501-504 describe the process of selecting a proxy server by the UE. During the process, the UE detects network conditions such as the bandwidth of each proxy server in the network according to the received proxy server information, and selects a destination proxy server according to the detection result.

505: Proxy 1 receives a conference request and determines whether the conference request carries a conference number.

If no conference number is carried, the conference request is a request for creating a conference, and step 506 is performed.

If a conference number is carried, the conference request is a request for joining a conference, and the information of the floor server where the conference corresponding to the conference number is located is requested from the center server.

In this embodiment, in step 505, the type of the conference request is determined. If the conference request carries a conference number, the conference request is a request for joining a conference; if the conference request carries no conference number, the conference request is a request for creating a conference. Therefore, the following steps are described based on the case where the conference request carries no conference number.

506: Request information of the floor servers registered in the Center from the center server Center.

In this embodiment, the conference request carries no conference number. Therefore, the information acquisition request from the proxy server to the Center carries no information of the conference number.

507: The Center returns the information of the floor servers registered in the Center to Proxy 1 according to the request.

In this embodiment, when receiving the request for returning the floor server information, the Center determines whether the request carries a conference number; if a conference number is carried, returns information of the server where the conference indicated by the conference number is located; otherwise, returns the information of the floor servers registered in the center server.

508: Proxy 1 detects the floor servers in the floor server information according to the received floor server information, and uses a floor server Floor 1 complying with a first present standard as a destination floor server.

In this embodiment, step 508 specifically includes: sending detection information to the floor servers in the floor server information; receiving information returned by the floor servers according to the detection information; and acquiring the speeds of the floor servers and the current statuses of the floor servers according to the information returned by the floor servers.

The detection information is used to request the speeds (that is, available bandwidths) and current statuses of the floor servers. It should be noted that the current statuses of the floor servers, that is, busy degree of the floor servers, may be measured by whether the floor servers are occupied by conferences or whether conferences are queuing for the floor servers.

In this embodiment, the first preset standard may be that the floor servers whose current status is that they are occupied by the conferences or the number of conferences queuing for the floor servers is smaller than a first preset threshold, and the speeds of the floor servers are the highest among the floor servers smaller than the preset threshold. That is, a floor server in the detected floor severs that complies with the first preset standard is used as a destination floor server. Selection of the floor server may optimize a communication channel of the network conference, and enable the proxy server to select the floor server according to the network condition. The first preset threshold may be set by the conference system according to the conference capacity, the number of conference members, or the processing speed of the floor server.

509: Send the request for creating the conference to the destination floor server Floor 1.

Those skilled in the art may acquire that the conference request in step 509 may be a request for establishing a media channel.

510: Proxy 1 establishes a media channel with Floor 1.

511: Proxy 1 establishes a media channel with the UE.

It should be noted that establishing a media channel between a proxy server and a floor server, and a media channel between a proxy server and the UE is common knowledge for those skilled in the art, which is not detailed here.

512: Proxy 1 sends registration information to the Center.

In this embodiment, the registration information includes the conference number of the destination floor server and a local address, and the registration information is sent to the Center by using the registration information so that the Center acquires the active proxy server and the active conference in the current system. It should be noted that the conference number is generated during the process of establishing the conference, which is not detailed in the present invention.

Before step 512, the method further includes: receiving a conference number from the destination floor server and forwarding the conference number to the user equipment.

The conference number from the destination floor server is assigned by the destination floor server.

513: The UE carries out a network conference with the center by using the established media channels.

The user equipment may detect the proxy servers according to the information provided by the center server and select a proxy server complying with a standard as a destination proxy server; or the proxy server may detect the floor servers according to the information provided by the center server and use a floor server complying with a standard as a destination floor server, which ensures that services used by users during a network conference are provided by the proxy server or floor server complying with the standard, and improves the quality of the network conference.

Figure 6A:
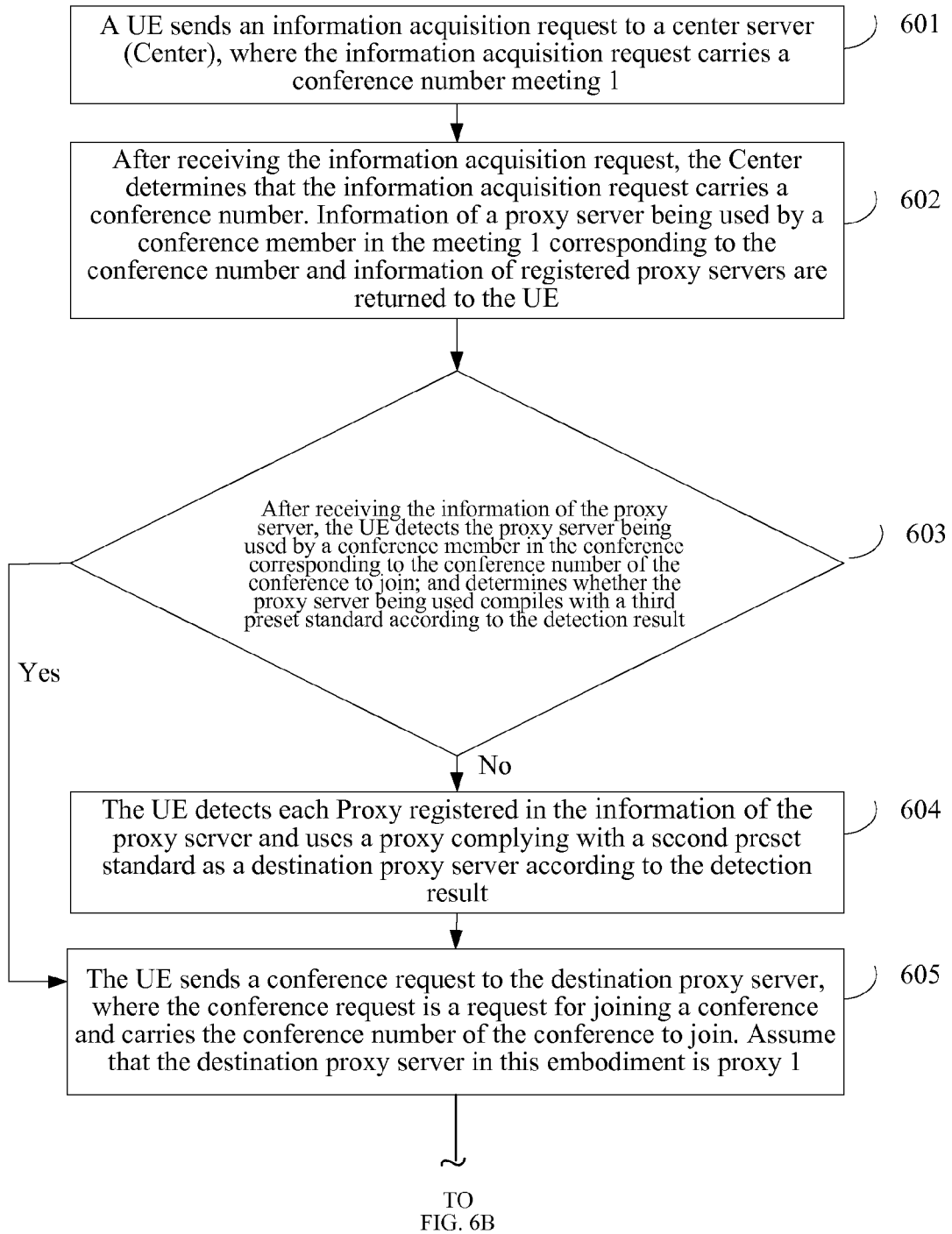

FIG. 6 is a flow chart of a network conference method according to another embodiment of the present invention. As shown in FIG. 6, in this embodiment, the technical solution according to this embodiment is described in detail by using the case where a UE initiates a conference request for joining a conference, the request for joining a conference carries a conference number of the conference to join, the conference corresponding to the conference number is Meeting 1, and the floor server where Meeting 1 is located is Floor 2 as an example. The method according to this embodiment includes:

601: A UE sends an information acquisition request to a center server (Center), where the information acquisition request carries a conference number meeting 1.

602: After receiving the information acquisition request, the Center determines that the information acquisition request carries a conference number. Information of a proxy server being used by a conference member in the meeting 1 corresponding to the conference number and information of registered proxy servers are returned to the user equipment.

Preferably, the proxy server that is processing the conference is marked active.

603: After receiving the proxy server information, the UE detects the proxy server being used by a conference member in the conference corresponding to the conference number of the conference to join; and determines whether the proxy server being used compiles with a third preset standard according to the detection result. If the proxy server being used compiles with the third preset standard, a proxy server being used is used as a destination proxy server and step 605 is directly performed; otherwise, step 604 is performed.

According to an embodiment of the present invention, the third preset standard is set according to the capacity and processing speed of the current proxy server. Preferably, the third preset standard may be that the speed of the proxy server is greater than a preset threshold, and the current status is that the number of members joining the conference on the proxy server is smaller than the preset threshold.

The third preset standard is specifically used to determine whether a proxy server being used is suitable for accessing a new user equipment. In this way, when the new user equipment joins the conference, the quality of the network conference can be ensured.

604: The UE detects each Proxy registered in the proxy server information and uses a proxy complying with a second preset standard as a destination proxy server according to the detection result.

Specifically, the UE sends the detection information to the registered proxy servers; when information returned by the registered proxy servers according to the detection information is received, acquires the speeds of the proxy servers and the current status of each proxy server according to the information returned by the registered proxy servers; and uses a proxy server complying with a second preset standard as a destination proxy server according to the speeds of the proxy servers and the current status of each proxy server.

605: The UE sends a conference request to the destination proxy server, where the conference request is a request for joining a conference and carries the conference number of the conference to join. Assume that the destination proxy server in this embodiment is proxy 1.

606: Proxy 1 sends an information acquisition request, where the information acquisition request carries the conference number of the conference to join.

607: The Center returns information of a floor server where the conference corresponding to the conference number of the conference to join is located.

In this embodiment, the information of the floor server where a conference indicated by the conference number is located includes the address of the floor server Floor 2.

608: After receiving the information returned by the Center, Proxy 1 sends a conference request to the floor server.

When the request for joining the conference carries the conference number of the conference to join and information of the floor server where the conference corresponding to the conference number of the conference to join is located, steps 606-608 may be replaced by the following step: Proxy 1 sends the conference request to the floor server where the conference corresponding to the conference number of the conference to join is located.

It should be noted that the conference request is sent by the UE to Proxy 1. This step may be understood that Proxy 1 forwards the request for joining the conference from the UE to the floor server where the conference corresponding to the conference number of the conference to join is located.

The principles of steps 609-612 and steps 510-513 are the same, which are not detailed here.

The user equipment has acquired the conference number of the conference to join. Therefore, before step 513, the floor server does not need to assign a conference number to the proxy server, and the proxy server does not need to forward the conference number to the user equipment either. If the selected access server is another access server, step 513 needs to be performed. That is, the floor server assigns the conference number contained in the request for joining the conference to the proxy server, and the proxy server forwards the conference number to the user equipment.

The user equipment may detect the proxy servers according to the information provided by the center server and select a proxy server complying with a standard as a destination proxy server; or the proxy server may detect the floor servers according to the information provided by the center server and use a floor server complying with a standard as a destination floor server, which ensures that services used by users during a network conference are provided by the proxy server or floor server complying with the standard, and improves the quality of the network conference.

Figure 7:
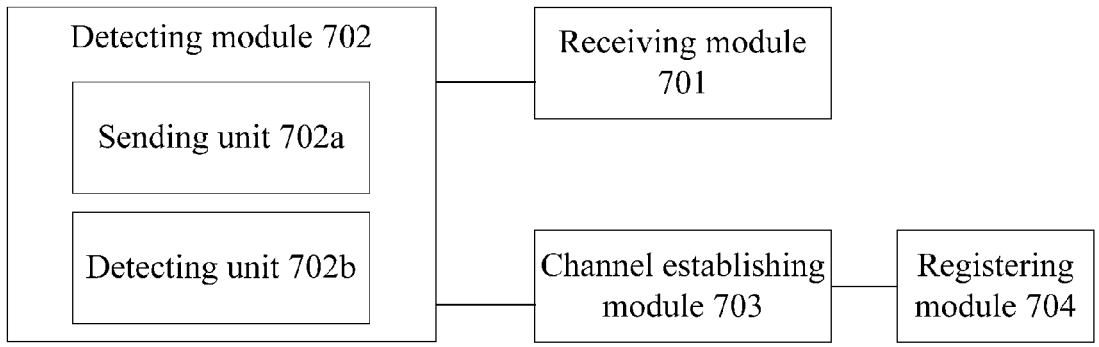
FIG. 7 is a schematic structural diagram of a proxy server according to an embodiment of the present invention.

Referring to FIG. 7, FIG. 7 is a schematic structural diagram of a proxy server according to the present invention. The proxy server includes:

a receiving module 701, configured to receive a conference request for creating a conference from a user equipment, send an information acquisition request to a center server, and receive information of floor servers registered in the center server that is returned by the center server;

a detecting module 702, configured to detect floor servers in the floor server information according to the floor server information, use a floor server complying with a first preset standard as a destination floor server, and send the conference request to the destination floor server; and a channel establishing module 703, configured to establish a media channel between a local proxy server and the destination floor server, and a media channel between the local proxy server and the user equipment respectively to enable the user equipment to carry out a network conference with the floor server by using the established media channels.

The detecting module 702 includes:

a sending unit 702*a*, configured to send detection information to the floor servers in the floor server information; and a detecting unit 702*b*, configured to receive information returned by the floor servers according to the detection information, and acquire speeds of the floor servers and current statuses of the floor servers according to the information returned by the floor servers.

The receiving module is further configured to:

receive a conference number from the destination floor server, where the conference number from the destination floor server is assigned by the destination floor server.

The proxy server further includes:

a registering module 704, configured to send registration information to the center server, where the registration information includes the conference number from the destination floor server and a local address.

The receiving module 701 is further configured to receive a request for joining a conference from a second user equipment, where the request for joining the conference carries the conference number of the conference to join; and receive information of the floor server where the conference corresponding to the conference number of the conference to join is located.

The channel establishing module 703 is further configured to establish, according to the information of the floor server where the conference corresponding to the conference number of the conference to join is located, a media channel with the floor server where the conference corresponding to the conference number of the conference to join is located, and send the conference number contained in the join request to the center server.

The receiving module 701 is further configured to receive a request for joining a conference from a second user equipment, where the request for joining the conference carries the conference number of the conference to join and information of the floor server where the conference corresponding to the conference number of the conference to join is located.

The channel establishing module 703 is further configured to establish, according to the information of the floor server where the conference corresponding to the conference number of the conference to join is located, a media channel with the floor server where the conference corresponding to the conference number of the conference to join is located, and send the conference number contained in the join request to the center server.

The proxy server provided in this embodiment and method embodiments are based on the same concept. Therefore, the detailed implementation may refer to the description of the method embodiments of the present invention, which is not detailed here. In addition, the proxy server according to the present invention may be a computer, and functions of modules of the proxy server may be implemented by the processor of the computer. Assuredly, the proxy server according to the present invention may also be another physical entity having such functions.

The proxy servers may detect the floor servers according to the information provided by the center server and use a floor server complying with a standard as a destination floor server, which ensures that services used by users during a network conference are provided by the floor server complying with the standard, and improves the quality of the network conference.

Figure 8:
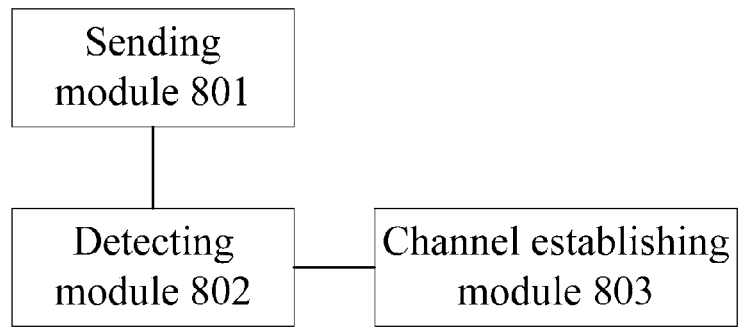
FIG. 8 is a schematic structural diagram of a user equipment according to an embodiment of the present invention.

Referring to FIG. 8, FIG. 8 is a schematic structural diagram of a user equipment according to an embodiment of the present invention. The user equipment includes:

a sending module 801, configured to send an information acquisition request to a center server; and a detecting module 802, configured to, when proxy server information returned by the center server is received, detect proxy servers in the proxy server information, and use a proxy server complying with a standard as a destination proxy server according to the detection result; where the sending module 801 is further configured to send a conference request to the destination proxy server.

The user equipment further includes:

a channel establishing module 803, configured to establish a media channel with the destination proxy server, and carry out a network conference by using the established media channel.

The information acquisition request carries the conference number of the conference to join, and the proxy server information includes information of a proxy server being used by a conference member in the conference corresponding to the conference number of the conference to join, and information of registered proxy servers.

The detecting module 802 is specifically configured to detect the proxy server being used by a conference member in the conference corresponding to the conference number of the conference to join according to the information of the proxy server being used by the conference member in the conference corresponding to the conference number of the conference to join; determine that the proxy server being used by the conference member in the conference corresponding to the conference number of the conference to join does not comply with a third preset standard; send detection information to the registered proxy servers according to the information of the registered proxy servers; and use a proxy server complying with a second preset standard as a destination proxy server according to the detection result.

The sending the detection information to the registered proxy servers according to the information of the registered proxy servers and using a proxy server complying with a second preset standard as a destination proxy server according to the detection result, by the detecting module 802, includes: sending the detection information to the registered proxy servers; when information returned by the registered proxy servers according to the detection information is received, acquiring speeds of the proxy servers and a current status of each proxy server according to the information returned by the registered proxy servers; and using the proxy server complying with the second preset standard as the destination proxy server according to the speeds of the proxy servers and the current status of each proxy server.

The information acquisition request carries the conference number of the conference to join, and the proxy server information includes information of a proxy server being used by a conference member in the conference corresponding to the conference number of the conference to join, and information of registered proxy servers.

The detecting module 802 is specifically configured to: detect the proxy server being used by a conference member in the conference corresponding to the conference number of the conference to join according to the information of the proxy server being used by the conference member in the conference corresponding to the conference number of the conference to join; and determine that the proxy server being used by the conference member in the conference corresponding to the conference number of the conference to join complies with a third preset standard, and use the proxy server being used as the destination proxy server.

The proxy server information is the information of the registered proxy servers.

The detecting module 802 is specifically configured to: send the detection information to the registered proxy servers; when information returned by the registered proxy servers according to the detection information is received, acquire the speeds of the proxy servers and the current status of each proxy server according to the information returned by the registered proxy servers; and use a proxy server complying with a second preset standard as a destination proxy server according to the speeds of the proxy servers and the current status of each proxy server.

The user equipment provided in this embodiment and method embodiments are based on the same concept. Therefore, the detailed implementation may refer to the method embodiments of the present invention, which is not detailed here.

The user equipment may detect the proxy servers according to the information provided by the center server and select a proxy server complying with a standard as a destination proxy server, which ensures that services used by users during a network conference are provided by the proxy server complying with the standard, and improves the quality of the network conference.

Figure 9:
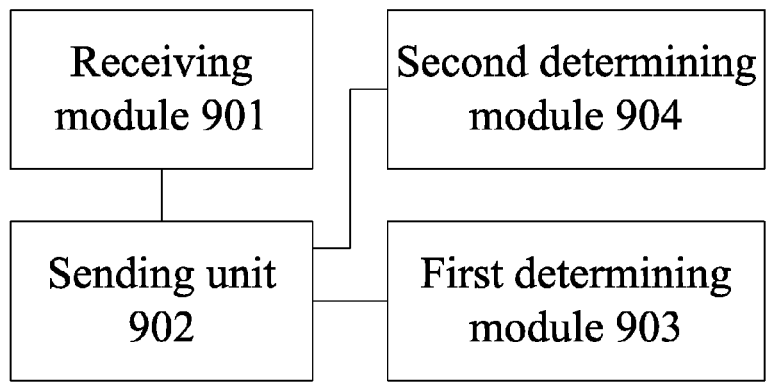
FIG. 9 is a schematic structural diagram of a center server according to an embodiment of the present invention.

Referring to FIG. 9, FIG. 9 is a schematic structural diagram of a center server according to an embodiment of the present invention. The center server includes:

a receiving module 901, configured to receive an information acquisition request from proxy servers; and a sending module 902, configured to return information of registered floor servers to the proxy servers so that the proxy servers detect the floor servers in the floor server information according to the floor server information, use a floor server complying with a first preset standard as a destination floor server, and send a conference request for creating a conference received from a user equipment to the destination floor server.

The center server further includes a first determining module 903, configured to determine that the information acquisition request sent by the proxy server carries the conference number.

The information of the registered floor servers of the proxy servers that is returned by the sending module 902 further includes information of a floor server where the conference corresponding to the conference number is located.

The receiving module 901 is further configured to receive an information acquisition request from a user equipment. The sending module 902 is further configured to return information of registered proxy servers to the user equipment so that the user equipment detects the proxy servers in the proxy server information, and uses a proxy server complying with a standard as a destination proxy server according to the detection result.

The center server further includes a second determining module 904, configured to determine that the information acquisition request sent by the user equipment carries the conference number of a conference to join.

The information of the registered proxy servers that is returned by the sending module 902 to the user equipment further includes information of a proxy server being used by a conference member in the conference corresponding to the conference number of the conference to join.

The receiving module 901 is further configured to receive the conference number of a newly created conference from a floor server, and map the conference number to the information of the floor server and store the mapping; and receive the conference number of an ended conference from the floor server, and delete the conference number of the ended conference from the stored conference number and floor server information; and/or the receiving module 901 is further configured to receive the conference number of an added conference for processing from a proxy server, and map the conference number of the added conference for processing to the information of the access server and store the mapping; and receive the conference number of an ended conference from the proxy server, and delete the conference number of the ended conference from the stored conference number and proxy server information.

The center server provided in this embodiment and method embodiments are based on the same concept. Therefore, the detailed implementation may refer to the method embodiments of the present invention, which is not detailed here. In addition, the center server according to the present invention may be a computer, and functions of modules of the center server may be implemented by the processor of the computer. Assuredly, the center server according to the present invention may also be another physical entity having such functions.

The floor server information is provided to the proxy servers and the proxy server information is provided to the user equipment so that the proxy servers may select, according to the information provided by the center server, a floor server complying with a standard as a destination floor server; or the user equipment may select, according to the information provided by the center server, a proxy server complying with a standard as a destination proxy server, which ensures that services used by users during a network conference are provided by the proxy server or floor server complying with the standard, and improves the quality of the network conference.

All or part of the technical solutions according to the embodiments of the present invention may be implemented by a program instructing relevant hardware. The program may be stored in a computer readable storage medium. The storage medium includes various mediums capable of storing program code, such as a ROM, a RAM, a magnetic disk, or a CD-ROM.

The above descriptions are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A network conference method, comprising:
receiving a conference request for creating a first conference from a first user equipment, and sending a first information acquisition request to a center server;
receiving information of floor servers registered in the center server that is returned by the center server;
detecting floor servers in the floor server information according to the floor server information, using a first floor server complying with a first preset standard as a destination floor server, and sending the conference request to the destination floor server; and
establishing a media channel between a local proxy server and the destination floor server, and a media channel between the local proxy server and the first user equipment respectively to enable the user equipment to carry out a network conference with the floor server by using the established media channels;
wherein detecting the floor servers in the floor server information according to the floor server information comprises:
sending detection information to the floor servers in the floor server information; and
receiving information returned by the floor servers according to the detection information, and acquiring speeds of the floor servers and current statuses of the floor servers according to the information returned by the floor servers, wherein each of the current statuses of the floor servers comprises a busy degree of each of the floor servers; and
wherein the first floor server complying with the first preset standard has a highest speed among a plurality of floor servers whose current statuses are that a quantity of conferences occupying or queuing for each of the plurality of floor servers is smaller than a first preset threshold.

2. The method according to claim 1, wherein after establishing the media channel between the local proxy server and the destination floor server, the method further comprises:
receiving a first conference number from the destination floor server, wherein the first conference number from the destination floor server is assigned by the destination floor server.

3. The method according to claim 2, wherein after receiving the conference number from the destination floor server, the method further comprises:
sending registration information to the center server, wherein the registration information comprises the first conference number from the destination floor server and a local address.

4. The method according to claim 1, further comprising:
receiving a request for joining a second conference from a second user equipment, wherein the request for joining the second conference carries a second conference number of the second conference to join;
sending a second information acquisition request to the center server, wherein the second information acquisition request carries the second conference number;
receiving information of a second floor server where the second conference is located; and
establishing, according to the information of the second floor server, a media channel with the second floor server, and sending the second conference number contained in the join request to the center server.

5. The method according to claim 1, further comprising:
receiving a request for joining a second conference from a second user equipment, wherein the request for joining the second conference carries a second conference number of the second conference to join and information of a second floor server where the second conference is located; and
establishing, according to the information of the second floor server, a media channel with the second floor server, and sending the second conference number contained in the join request to the center server.

6. A proxy server, comprising a memory and a processor, wherein the processor is configured to:
receive a first conference request for creating a first conference from a first user equipment, send a first information acquisition request to a center server, and receive information of floor servers registered in the center server that is returned by the center server;
detect floor servers in the floor server information according to the floor server information, use a first floor server complying with a first preset standard as a destination floor server, and send the conference request to the destination floor server; and
establish a media channel between a local proxy server and the destination floor server, and a media channel between the local proxy server and the first user equipment respectively to enable the first user equipment to carry out a network conference with the floor server by using the established media channels;
wherein the processor is further configured to:
send detection information to the floor servers in the floor server information; and
receive information returned by the floor servers according to the detection information, and acquire speeds of the floor servers and current statuses of the floor servers according to the information returned by the floor servers, wherein each of the current statuses of the floor servers comprises a busy degree of each of the floor servers; and
wherein the first floor server complying with the first preset standard has a highest speed among a plurality of floor servers whose current statuses are that a quantity of conferences occupying or queuing for each of the plurality of floor servers is smaller than a first preset threshold.

7. The proxy server according to claim 6, wherein the processor is further configured to:
receive a first conference number from the destination floor server, wherein the first conference number from the destination floor server is assigned by the destination floor server.

8. The proxy server according to claim 6, the processor is further configured to:
send registration information to the center server, wherein the registration information comprises the conference number from the destination floor server and a local address.

9. The proxy server according to claim 6, wherein the processor is further configured to receive a second request for joining a second conference from a second user equipment, wherein the second request for joining the second conference carries a second conference number of the second conference to join; and receive information of a second floor server where the second conference corresponding to the second conference number of the second conference to join is located; and
the processor is further configured to establish, according to the information of the second floor server, a media channel with the second floor server, and send the second conference number contained in the join request to the center server.

10. The proxy server according to claim 6, wherein the processor is further configured to receive a second request for joining a second conference from a second user equipment, wherein the second request for joining the second conference carries a second conference number of the second conference to join and information of a second floor server where the second conference corresponding to the second conference number of the second conference to join is located; and
the processor is further configured to establish, according to the information of the second floor server, a media channel with the second floor server, and send the second conference number contained in the join request to the center server.

11. A user equipment, comprising a memory and a processor, wherein the processor is configured to:

send an information acquisition request to a center server; and when proxy server information returned by the center server is received, detect proxy servers in the proxy server information, and use a first proxy server complying with a first standard as a first destination proxy server according to a detection result;

send a conference request to the first destination proxy server; and establish a media channel with the first destination proxy server, and carry out a network conference by using the established media channel;

wherein the information acquisition request carries a conference number of the conference to join; and the proxy server information comprises information of a proxy server being used by a conference member in the conference corresponding to the conference number and information of registered proxy servers; and the processor is configured to detect the proxy server being used by the conference member according to the information of the proxy server being used b the conference member; determine that the proxy server does not comply with a third preset standard; send detection information to the registered proxy servers according to the information of the registered proxy servers; and use a second proxy server complying with a second preset standard as a second destination proxy server according to the detection result;

wherein the sending, by the processor, the detection information to the registered proxy servers according to the information of the registered proxy servers and using the second proxy server complying with the second preset standard as the second destination proxy server according to the detection result is: sending the detection information to the registered proxy servers; when information returned by the registered proxy servers according to the detection information is received, acquiring speeds of the proxy servers and a current status of each proxy server according to the information returned by the registered proxy servers; wherein the current status of each proxy server comprises a busy degree of each proxy server; and using the second proxy server complying with the second preset standard as the destination proxy server according to the speeds of the proxy servers and the current status of each proxy server; and wherein the first floor server complying with the second preset standard has a highest speed among a plurality of floor servers whose current statuses are that a quantity of conferences occupying or queuing for each of the plurality of floor servers is smaller than a first preset threshold.

12. The user equipment according to claim 11, wherein the information acquisition request carries a conference number of the conference to join; and the proxy server information comprises information of a proxy server being used by a conference member in the conference corresponding to the conference number of the conference to join, and information of registered proxy servers; and the processor is configured to detect the proxy server being used by the conference member in the conference according to the information of the proxy server being used by the conference member; and determine that the proxy server complies with a third preset standard, and use the proxy server being used as a third destination proxy server.

13. The user equipment according to claim 11, wherein the proxy server information is information of registered proxy servers; and the processor is configured to: send detection information to the registered proxy servers; when information returned by the registered proxy servers according to the detection information is received, acquire speeds of the proxy servers and a current status of each proxy server according to the information returned by the registered proxy servers; and use a second proxy server complying with a second preset standard as a second destination proxy server according to the speeds of the proxy servers and the current status of each proxy server.

* * * * *

UNITED STATES PATENT AND TRADEMARK OFFICE
CERTIFICATE OF CORRECTION

PATENT NO.        : 9,300,702 B2                                    Page 1 of 1
APPLICATION NO.   : 13/707470
DATED             : March 29, 2016
INVENTOR(S)       : Riming Zhou It is certified that error appears in the above-identified patent and that said Letters Patent is hereby corrected as shown below:

Claims

Column 15, line 21 "b" should read -- by --.

Signed and Sealed this
Seventh Day of June, 2016

Michelle K. Lee
*Director of the United States Patent and Trademark Office*